Aug. 16, 1955  W. S. STAIR  2,715,515
AIR CONDITIONING SYSTEM
Filed Sept. 10, 1951  2 Sheets-Sheet 1

Inventor
William S. Stair
By Dodge and Sons
Attorneys

Aug. 16, 1955  W. S. STAIR  2,715,515
AIR CONDITIONING SYSTEM
Filed Sept. 10, 1951  2 Sheets-Sheet 2

Inventor
William S. Stair
By Dodge and Sons
Attorneys

United States Patent Office 2,715,515
Patented Aug. 16, 1955

2,715,515

AIR CONDITIONING SYSTEM

William S. Stair, York, Pa., assignor to York Corporation, York, Pa., a corporation of Delaware Application September 10, 1951, Serial No. 245,895

8 Claims. (Cl. 257—3)

This invention relates to heating and cooling installations for office buildings, apartment houses, hotels and the like.

According to the invention, a circulating system for a heat exchange medium is provided. This system includes a plurality of supply and collector risers. Connected in parallel between each pair of supply and collector risers is a plurality of individual room units. Each of these room units includes a heating radiator and conventional refrigerating apparatus of the condenser-compressor-evaporator type. The condensers are liquid cooled. The liquid path of the condenser and that of the radiator are part of the circulating system and are connected in series between a supply riser and a collector riser. A valve controlled by-pass is provided so that the flow of liquid to the radiator may be interrupted when desired.

The circulating system includes a heater and a cooler preferably of the evaporative cooling type, which may be operated alternatively or which may both be shut down. The heater is controlled by thermostatic means which is primarily responsive to temperature of the circulated medium, but the control point may be shifted in response to outdoor temperature.

During the heating season the evaporative cooling means is shut down, as is the refrigerating apparatus in the room units. The heating radiators are supplied from the circulating system with heat exchange medium at an elevated temperature. It will be seen that operation of the system under these conditions is similar to a conventional hot water heating system. During the heating season the heat exchange medium is circulated through the water path of each of the condensers which are connected in series with the radiators. This arrangement is desirable, because the piping and valving of the room units is simplified. It can be used only if the refrigerating apparatus has a capacity sufficient to permit vaporization of all of the refrigerant in the system at the temperature characteristic of the heat exchange medium during this season. The pressure in this apparatus must not exceed safe limits when this vaporization occurs. This requirement can be met, but the compressor must be idle during this season. A thermostatic switch responsive to the temperature of the heat exchange medium leaving the condenser can be provided to prevent operation of the compressor during the heating season. This same switch will act as a safety switch whenever the compressor is running during other seasons of the year.

During the cooling season this same heat exchange medium is caused to flow through the evaporative cooling means and is supplied to the units at a reduced temperature to cool the condensers of the refrigerating apparatus which is running.

If it is desired to cool and to lower the relative humidity of the room air, the flow of liquid to the radiator is interrupted and the heat exchange medium is caused to flow directly to the collector risers. If cooling is not desired, the flow of liquid from the condenser to the radiator may be established. The radiator functions under these conditions as a conventional reheater whereby the unit operates to lower the relative humidity of the room air, but does not greatly lower the room air temperature.

Between seasons some of the rooms may require heating and others cooling. Under these conditions the heat exchange medium from the circulating system is supplied to the room units at an intermediate temperature. The liquid at this temperature will serve to supply heat to some of the rooms and will cool the condensers in other room units. The desired operation of the room unit is under the control of the room's occupant without regard to the operation of other units in the system. Between seasons either the central heater or the central cooler may be operated. However, under certain load conditions they may both be shut down. These last conditions occur when the heat rejected to the circulated medium in those rooms which are being cooled is equal to the amount of heat delivered in the rooms which are being heated.

A heating and cooling system made according to the invention does away with the necessity of providing the extensive duct work characteristic of systems in which a large central conditioning plant is employed for summer cooling. It also does away with the ineconomies of such a system, which result from the operation of the large plant between seasons when the cooling load is small. Further, the individual units are economically operated because water-cooled condensers are used. An important advantage present in systems constructed according to this invention is that a single circulating system is used during both heating and cooling season and also between seasons, and may operate either as a heat source or as heat absorber.

Where ample water supply permits, the evaporative water cooling means may be eliminated and fresh water supplied to the circulating system for condensing purposes during the cooling season. Between seasons the heat exchange medium can be maintained at a temperature suitable for both heating or condensing by either the addition of fresh water or operation of the heater as conditions may require.

The invention will be described by reference to the accompanying drawings, in which.

Figure 1:
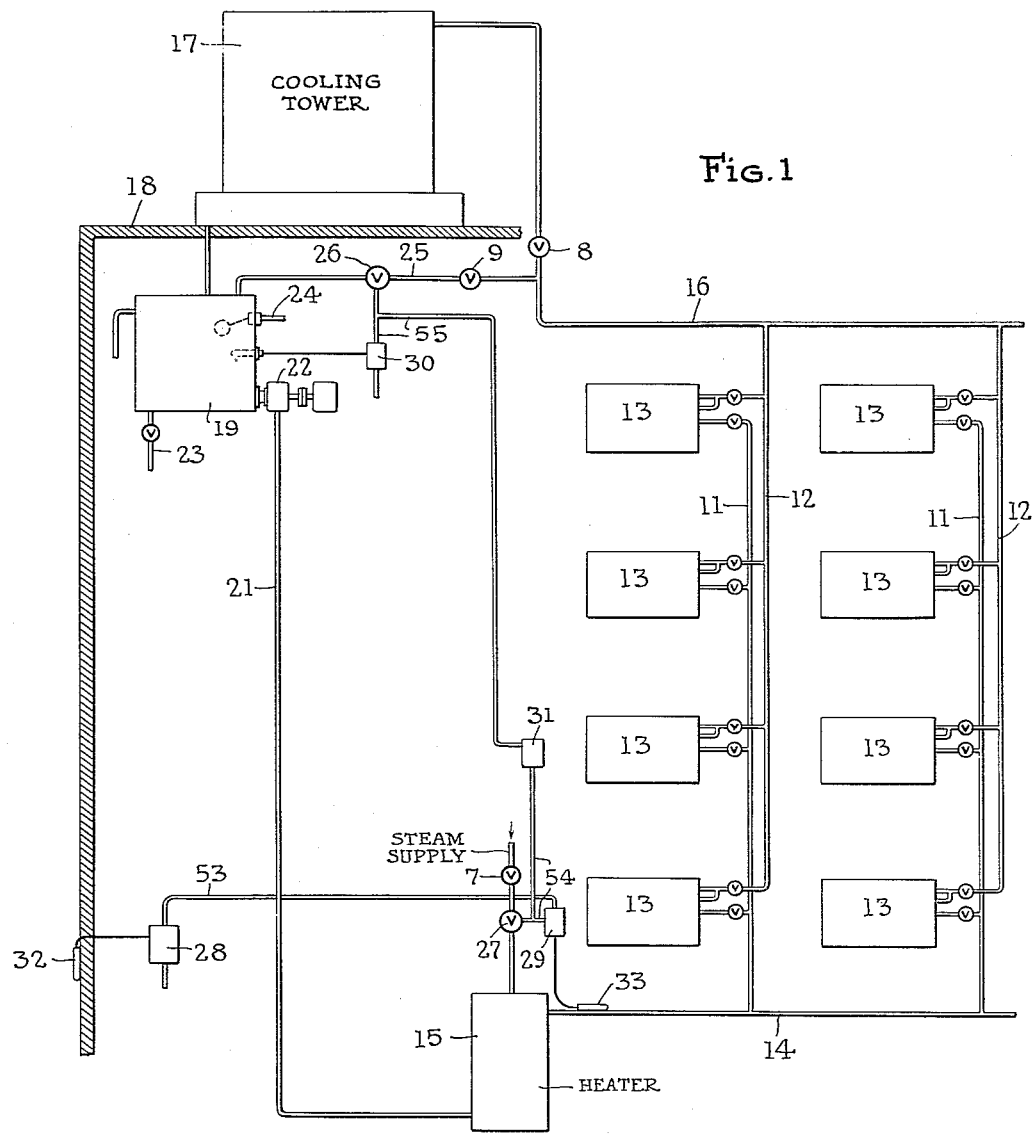
Figure 1 is a diagrammatic showing of a system embodying the invention.

Refer first to Figure 1. The liquid circulating system includes a plurality of supply and collector risers 11 and 12 respectively. A plurality of room units 13 are connected in parallel between a pair of risers 11 and 12. A manifold 14 extends between a heater 15 and the supply risers 11. A return manifold 16 extends between the collector risers 12 and a cooling tower 17 located on the roof 18 of the building. The fluid leaving the cooling tower 17 flows to an expansion tank 19 located within the building near the roof 18. A connection 21 extends from the tank 19 to the heater 15. A motor driven pump 22 causes forced circulation through the system. The expansion tank 19 has a drain connection 23 and a float controlled make-up connection 24.

The cooling tower 17 is provided with a by-pass 25. Flow through this by-pass is controlled by a pneumatic thermostatically controlled valve 26 which is normally open. The flow of steam to the heater 15 is controlled by pneumatically operated valve 27 which is thermostatically controlled. This valve is closed when the pressure in the pneumatic control system is below a certain amount. In the illustrated embodiment, this thermostatic control system includes the pneumatic thermostats 28, 29 and 30 and a relay valve 31. The thermostat 28 responds to the temperature of the outdoor air which is sensed by the bulb 32. The branch line 53 of the thermostat 28 supplies air to the thermostat 29 which is controlled in response to the temperature of the circulating medium leaving the heater 15. This temperature is sensed by a bulb 33. The branch line 54 of thermostat 29 is connected to the pneumatic valve 27. The thermostat 28 is a reverse acting instrument and serves to readjust the control point of the thermostat 29, so that as outdoor temperature falls, the temperature of the circulated medium is increased.

Rising outdoor temperature reduces the pressure in the branch line 53 of thermostat 28 and also in the branch line 54 of the thermostat 29. The pressure in the branch line 54 of thermostat 29 pilots the operation of the relay valve 31. Relay valve 31 is conditioned to vent the branch line 55 of the thermostat 30 as long as the pilot pressure to the relay 31 remains above a predetermined minimum value. At any pressure below this predetermined minimum the thermostat 30 becomes effective to control the opening and closing of the valve 26 in the cooling tower by-pass 25. The above-described control system is conventional and no novelty is alleged. Various other control schemes may be employed and the invention is not limited to use with a particular control system. Manually operated valves are provided in the steam supply at 7, the riser 16 at 8 and the by-pass 25, at 9. The system could be controlled by manipulation of these valves if desired.

Figure 2:
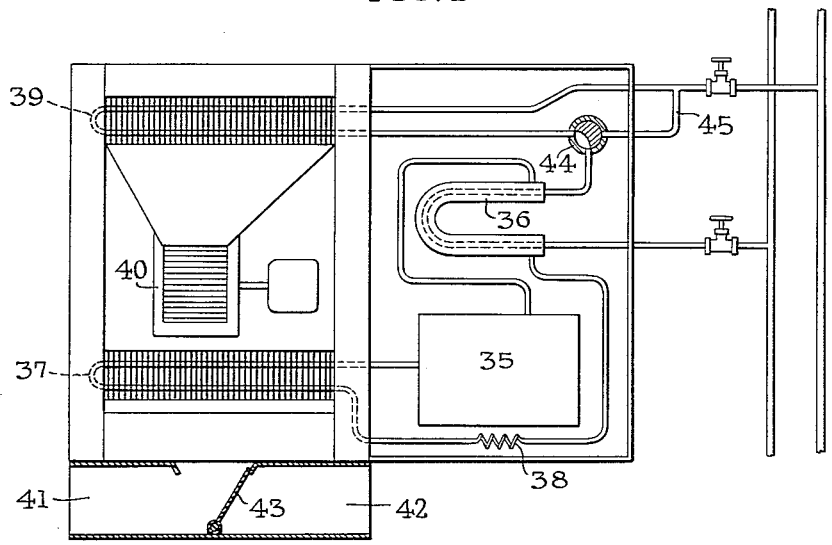
Figure 2 is a diagram of a typical room unit.

As shown in Figure 2, the rooms include refrigerating apparatus comprising a motor compressor unit 35, a water-cooled condenser 36 and an evaporator 37. Flow of refrigerant from the condenser to the evaporator is controlled by a restrictor tube 38, although a conventional expansion valve can be used. The condenser 36 is a conventional, double pipe condenser and the dotted lines indicate the enclosed water path. A fan 40, enclosed within the unit, draws air from the room and from outdoors through inlets 41 and 42 respectively. The proportions of fresh and room air circulated by the fan 40 are determined by the position of a damper 43. The damper 43 in the drawings is manually controlled, however, it might equally well be a motor controlled damper positioned automatically in response to selected temperatures; e. g., room temperature or room temperature and outdoor temperature together. Such control systems are conventional and are therefore not illustrated.

The flow of liquid through the radiator 39 is controlled by valve 44 which may be positioned to supply liquid to the radiator 39 or to the by-pass 45.

Figure 3:
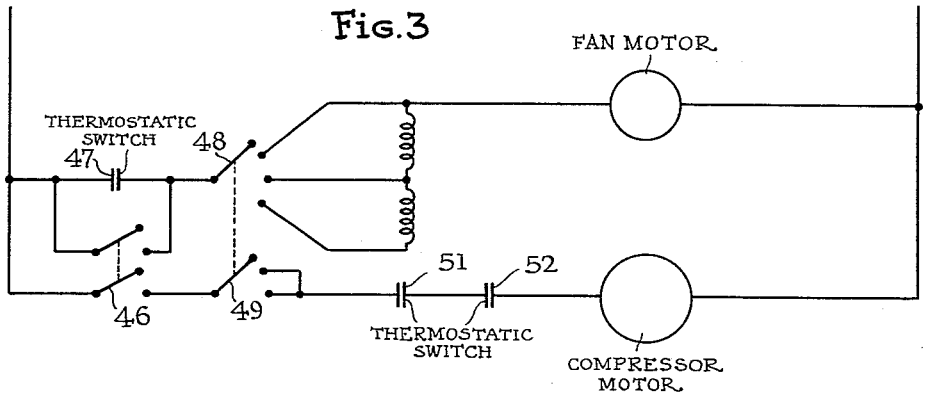
Figure 3 is a diagram of a suitable control circuit for one of the room units.

A suitable control circuit for one of the room units is shown diagrammatically in Figure 3. This circuit includes a main switch 46 for the compressor motor, which is closed whenever cooling is desired. The closure of this switch 46 closes a shunt circuit around the thermostatic switch 47. The switch 47 controls the operation of the fan motor when heating is desired. This switch 47 is controlled in response to room temperature. The fan motor may be stopped or it may be operated at any one of three speeds by the manual setting of the switch 48.

It will also be noted that the switch 49 in the compressor motor circuit is operated simultaneously with the switch 48. The switch 49 is opened whenever the switch 48 is set to operate the fan at low speed. This is done to protect against frosting of the evaporator which may occur as a result of insufficient air circulation over the evaporator.

The thermostatic switch 51 controls operation of the compressor motor during summer and is controlled in response to room temperature. The thermostatic switch 52 is a safety switch which operates to open the compressor motor circuit whenever the temperature of the cooling liquid leaving the condenser becomes too high. This switch 52 insures against accidental starting of the compressor motor during the heating season and protects against the creation of a dangerously high pressure in the refrigeration system which may result from inadequate cooling of the condenser particularly during the between seasons period.

During the heating season the valve 9 is opened so that the cooling tower 17 is by-passed by the circulating medium. The valve 8 may be closed and the valve 7 open. The heater 15 operates to maintain a suitable temperature in the heat exchange medium delivered to the room units 13. The temperature of the circulated medium is increased as outdoor temperature falls. The room unit fans 40 are operated at a selected speed, high, medium or low, depending upon the manual adjustment of the switch 48, and are automatically turned on or off by thermostatic switch 47 in response to changes of room temperature. The valve 44 is set to admit heat exchange medium to the radiator 39.

Experiments show that the heat exchange medium may be circulated through the condenser at the elevated temperature characteristic of it during the heating season without creating destructive pressure in the idle refrigeration system. It will be apparent that during the heating season the system is similar to a conventional hot water heating system having forced circulation.

During the cooling season the valve 7 is closed; valve 8 is open; and valve 9 may be closed, whereby the heat exchange medium returning from the room units 13 flows through the cooling tower 17. The refrigerating apparatus in the room units 13 is put in operation by closing the switch 46. This operation is controlled by the thermostatic switches 51 and 52.

The heating and cooling system operates under these circumstances like a cooling system in which a plurality of room air conditioning units is employed, but has an important economic advantage in that the condensers 36 are water-cooled whereby the refrigerating apparatus is operated at peak efficiency.

During the between seasons period, some of the rooms may require heating while others may require cooling. In order to meet this condition, the heat exchange medium is circulated through the system at an intermediate temperature. This temperature must be high enough to meet the relatively small heating load and must be low enough to cool the condensers in those room units being operated as coolers.

A temperature between 90° F. and 100° F. has been found to meet these requirements. This temperature is maintained by the degree of opening of the valve 26 which is controlled by the thermostat 30 which is responsive to the temperature of the liquid medium in the expansion tank 19.

During this between seasons period and also during the cooling season when the load is small, it may be desirable to dehumidify the room air without a large amount of cooling. Under this condition, the valve 44 may be set to admit fluid to the radiator 39, which then functions as a conventional reheater. It is to afford reheating and to simplify the piping to the unit that the condenser cooling path and the radiator are connected in series. Individual inlets and outlets could be afforded, and such an arrangement is within the scope of the present invention.

It will be apparent that the components of the system are conventional and may in practice take various forms. The invention is not limited to the particular apparatus or controls shown in the drawing other than as may be expressed in the appended claims.

What is claimed is:

1. A heating and cooling installation for buildings comprising a circulating system for a heat exchange medium, the circulating system including a supply header, and connected in parallel flow relation thereto, a plurality of supply risers and a return header, and connected in parallel flow relation thereto a plurality of return risers, means to circulate medium through the system, heating means operable to heat the medium circulated, and cooling means operable to cool the circulated medium, said heating and cooling means being selectively operable; a plurality of independently operable room units, each unit including a heating radiator connected between one of the aforesaid supply risers and one of the aforesaid return risers, and through which said medium may be circulated, means operable to terminate flow of the medium therethrough, refrigerating apparatus including an evaporator and a condenser, the condenser having a refrigerant course operatively connected with said evaporator and a liquid course connected between said one of the aforesaid supply risers and said one of the aforesaid return risers; means for circulating air to be supplied to the room in heat exchange relation with the evaporator and with the heating radiator; means to control the temperature of the circulated medium, said control means being selectively adjustable to cause the medium to be circulated at a selected temperature, said selection being made with regard to the load carried by the system, namely an elevated temperature during the heating season, and a low temperature during the cooling season and an intermediate temperature between seasons, said intermediate temperature being higher than the desired room temperature but low enough to act as a cooling medium for the condenser.

2. The combination defined in claim 1 in which the liquid course of the condenser and the flow path of the heating radiator are connected in series between said one of the aforesaid supply risers and said one of the aforesaid return risers, and the means operable to terminate flow comprises a valve-controlled by-pass connected between the entrance to said heating radiator and the exit therefrom.

3. The combination defined in claim 2 and control means responsive to the temperature of the circulating medium effective to disable the refrigerating apparatus when the temperature reaches the value characteristic of the system when operated as a heating system.

4. The combination defined in claim 1 and control means responsive to the temperature of the circulating medium effective to disable the refrigerating apparatus when the temperature reaches the value characteristic of the system when operated as a heating system.

5. A heating and cooling installation for buildings comprising a circulating system for a heat exchange medium, the circulating system including a supply riser and a return riser, means to circulate medium through the system, heating means operable to heat the medium circulated, and cooling means operable to cool the circulated medium, said heating and cooling means being selectively operable; a plurality of independently operable room units, each unit including a heating radiator connected between the supply riser and the return riser, and through which said medium may be circulated, means operable to terminate flow of the medium therethrough, refrigerating apparatus including an evaporator and a condenser, the condenser having a refrigerant course operatively connected with said evaporator and a liquid course connected between the supply riser and the return riser; means for circulating air to be supplied to the room in heat exchange relation with the evaporator and with the heating radiator; means to control the temperature of the circulated medium, said control means being selectively adjustable to cause the medium to be circulated at a selected temperature, said selection being made with regard to the load carried by the system, namely an elevated temperature during the heating season, and a low temperature during the cooling season and an intermediate temperature between seasons, said intermediate temperature being higher than the desired room temperature but low enough to act as a cooling medium for the condenser.

6. The combination defined in claim 5 in which the liquid course of the condenser and the flow path of the heating radiator are connected in series between the supply riser and the return riser, and the means operable to terminate flow comprises a valve-controlled by-pass connected between the entrance to said heating radiator and the exit therefrom.

7. The combination defined in claim 6 and control means responsive to the temperature of the circulating medium effective to disable the refrigerating apparatus when the temperature reaches the value characteristic of the system when operated as a heating system.

8. The combination defined in claim 5 and control means responsive to the temperature of the circulating medium effective to disable the refrigerating apparatus when the temperature reaches the value characteristic of the system when operated as a heating system.

References Cited in the file of this patent

UNITED STATES PATENTS

| Re. 22,100 | Brace et al. | May 26, 1942 |
| 2,150,224 | Hull | Mar. 14, 1939 |
| 2,177,602 | Spaan | Oct. 24, 1939 |
| 2,196,011 | Gibson | Apr. 2, 1940 |
| 2,244,551 | Crawford | June 3, 1941 |
| 2,257,975 | Miller et al. | Oct. 7, 1941 |
| 2,266,238 | Newton | Dec. 16, 1941 |